United States Patent [19]

Schubart

[11] Patent Number: 5,919,894

[45] Date of Patent: Jul. 6, 1999

[54] PROCESS FOR PREPARING POLYMERS WITH RECURRING SUCCINYL UNITS

[75] Inventor: Rüdiger Schubart, Bergisch Gladbach, Germany

[73] Assignee: Bayer AG, Leverkusen, Germany

[21] Appl. No.: 08/945,735

[22] PCT Filed: Apr. 22, 1996

[86] PCT No.: PCT/EP96/01671

§ 371 Date: Oct. 28, 1997

§ 102(e) Date: Oct. 28, 1997

[87] PCT Pub. No.: WO96/34908

PCT Pub. Date: Nov. 7, 1996

[30] Foreign Application Priority Data

May 4, 1995 [DE] Germany .............................. 195 16 399

[51] Int. Cl.$^6$ ...................................................... C08G 69/10
[52] U.S. Cl. .......................... 528/328; 528/363; 528/399; 525/419; 525/420
[58] Field of Search ...................................... 528/363, 328, 528/399; 525/419, 420

[56] References Cited

U.S. PATENT DOCUMENTS 5,296,578  3/1994  Koskan et al. ........................... 528/363

*Primary Examiner*—Duc Truong
*Attorney, Agent, or Firm*—Connolly & Hutz

[57] ABSTRACT

Polymers with repeating succinyl units, in particular polysuccinimide and polyaspartic acid, are prepared using triammonium salts, in particular triammonium phosphates.

20 Claims, No Drawings

PROCESS FOR PREPARING POLYMERS WITH RECURRING SUCCINYL UNITS

The invention relates to a process for the preparation of polymers with repeating succinyl units, in particular of polyaspartic acid and polysuccinimide.

The preparation and use of polysuccinimide and polyaspartic acid (PAA) and its derivatives have been the subject of numerous publications and patents for a long time.

U.S. Pat. No. 4,839,461 (=EP-A 0 256 366) describes the preparation of polyaspartic acid from maleic anhydride, water and ammonia Maleic anhydride is reacted in an aqueous medium, with the addition of concentrated ammonia solution, and is then polymerized. During this polymerization, the mass becomes first highly viscous and then solid-porous, which requires handling which is expensive in terms of process technology.

U.S. Pat. No. 5,296,578 describes the preparation of PSI from maleic anhydride, water and ammonia. Maleic anhydride is hydrolyzed in water to give maleic acid and this is then converted into the ammonium salt with concentrated ammonia solution. The water is evaporated off from the solution in a stirred reactor and the monoammonium salt is then polymerized in bulk at temperatures above 170° C. to give PSI. In this process, the mass is converted into solid PSI in the course of several hours via highly viscous phase states, and this is then hydrolyzed to give PAA.

U.S. Pat. No. 5,288,783 describes the preparation of PAA from maleic acid or fumaric acid, water and ammonia Maleic anhydride is mixed with water in a stirred tank and is converted into maleic acid, while cooling. The maleic acid monoammonium salt is prepared by addition of concentrated ammonia solution. The water contained in the mixture is then evaporated off and the dry monoammonium salt is polymerized at temperatures from 190 to 350° C. An alternative proposal is to process further the monoammonium salt present in aqueous solution to PSI by extrusion at temperatures from 160 to 200° C. The PSI prepared by one of the two process routes is then hydrolyzed to PAA under alkaline conditions.

EP-A 593 187 describes the preparation of PSI by thermal polymerization of maleamic acid at temperatures from 160 to 330° C. over a reaction time of 2 minutes to 6 hours. Reference is also made to polycondensation in a solvent using condensation auxiliaries.

DE-A 4 023 463 (U.S. Pat. No. 5,142,062) describes a process for the preparation of polysuccinimide in the presence of phosphoric acids. DE-A 4 221 875 (=WO 94/01486) describes the preparation of so-called modified polyaspartic acids by polycondensation of aspartic acid with other compounds, if appropriate in the presence of phosphoric acids or derivatives thereof. It is known from WO 95/02007 to prepare polymers of aspartic acid by heating maleic anhydride and acid derivatives of ammonia Phosphoric acid, inter alia, is mentioned as the acid. Of the corresponding salts, however, only diammonium hydrogen phosphate and monoammonium dihydrogen phosphate are mentioned. EP-A 604 813 (DE-A 4 244 031) discloses a process for the preparation of polysuccinimide and polyaspartic acid from maleamic acid in which maleic anhydride and ammonia are reacted to give maleamic acid and-the maleamic acid is subjected to polymerization, which can be carried out in the presence of phosphoric acids and polyphosphoric salts.

The disadvantage of the known preparation processes is that they are very expensive and to a large proportion lead to products with unsatisfactory bio degradability.

The invention is based on the object of providing an improved process for the preparation of polymers with repeating succinyl units, in particular of polysuccinimide and polyaspartic acid.

The invention relates to a process for the preparation of polymers with repeating succinyl units, which comprises bringing together at least one optionally substituted 1,4-butanedicarboxylic acid, butenedicarboxylic acid or a derivative thereof with a triammonium salt of a polybasic acid and carrying out the polymerization while heating.

The invention furthermore relates to a process for the preparation of polymers with repeating succinyl units, which comprises bringing together the anhydride of an optionally substituted 1,4-butanedicarboxylic acid or butenedicarboxylic acid, in particular maleic anhydride, with a triammonium salt of an organic or inorganic acid and carrying out the polymerization while heating.

For the purposes of the present invention, derivatives of optionally substituted 1,4-butanedicarboxylic acid/butenedicarboxylic acid are to be understood as, for example, salts and substitution products, such as, for example, hydroxy- and amino-substituted dicarboxylic acids. For the purposes of the present invention, the term polymerization means no limitation to a particular process for the preparation of higher molecular weight substances, and includes (addition) polymerizations in the narrower sense as well as, above all, polycondensation.

The polymers prepared according to the invention preferably contain repeating succinyl units having at least one of the following structures

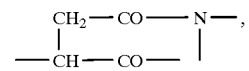

preferably

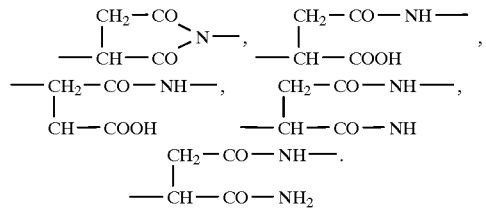

Depending on the embodiment, they can also contain iminodisuccinate units, preferably at least one of the following structures:

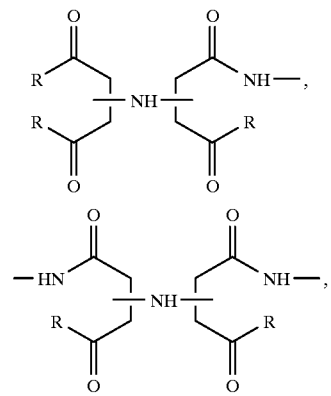

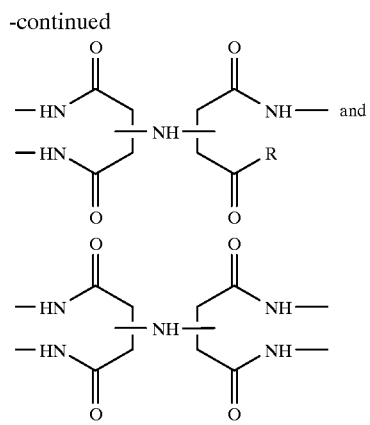

in which R denotes OH, O⁻NH₄⁺ or NH₂.

The iminodisuccinate units can be present in the polymer in random distribution or, preferably, as an end group. Where appropriate, the iminodisuccinate unit is present to the extent of at least 0.1 mol % based on the sum of all the repeating units. The molar ratio of the iminodisuccinate units incorporated in the polymer to the sum of all the monomer units incorporated in the polymer is preferably 0.1 mol % to 99 mol %, preferably 1 mol % to 50 mol %, particularly preferably 2 mol % to 25 mol %.

The polymers can additionally contain further repeating units by a suitable reaction procedure and choice of the starting materials, for example a) malic acid units of the formula

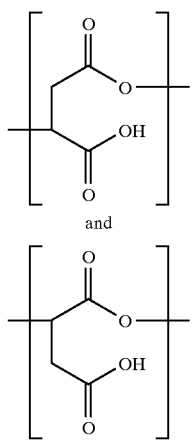

b) maleic acid and fumaric acid units of the formula

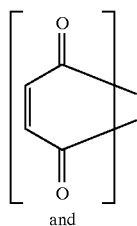

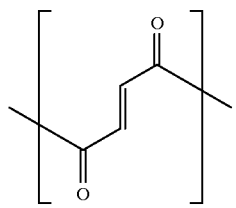

In a preferred embodiment, maleic anhydride, maleic acid, maleic acid derivatives, for example maleic acid esters and maleic acid half-esters, fumaric acid or fumaric acid derivatives are employed. Maleic acid and maleic anhydride are particularly preferred.

Particularly preferred triammonium salts are the corresponding compounds of citric acid, and in particular of phosphoric acid and of phosphorous acid. In a preferred embodiment of the invention, maleic anhydride and triammonium phosphate are reacted with one another.

In a preferred embodiment, the triammonium salt is employed as a reaction partner of optionally substituted dicarboxylic acid. It is particularly preferable here if ⅓ to 1.0 mol of triammonium salt, in particular 0.4 to 0.6, and especially 0.5 to 0.6 mol, is used per mole of, for example, maleic anhydride or optionally substituted dicarboxylic acid or mixtures thereof.

In a particularly preferred embodiment of the invention, maleic anhydride is used with triammonium phosphate in the melt in a ratio of about 1:0.505 preferably without added solvent, and melted together at about 60 to 100° C. in the presence of water of crystallization. The temperature is then increased to at least 140° C. to 250° C., preferably to 180° C. to 200° C., water being stripped off, for example by distillation. Further water can be stripped off, in particular by application of a vacuum.

The resulting polymerization product, which contains polysuccinimide units, can be hydrolyzed to polyaspartic acid and salts thereof in the customary manner.

The invention furthermore relates to a process for the preparation of polymers with repeating succinyl units, which comprises polymerizing a nitrogen-containing dicarboxylic acid, in particular aspartic acid, in the presence of catalytic amounts of an ammonium salt. In a preferred embodiment, an ammonium phosphate or ammonium phosphite is used as catalyst for the polymerization, that is to say for the preparation of polymers containing succinyl units. It is particularly preferred here to start from a substituted butanedicarboxylic acid, in particular aspartic acid. The aspartic acid here can be L-, D or DL-aspartic acid. In a preferred embodiment, 0.01 to 0.2 mol of triammonium salt, in particular 0.03 to 0.15 mol of triammonium salt, in particular triammonium phosphate and triammonium phosphite, is employed here per mole of N-substituted butanedicarboxylic acid. Catalytic amounts of diammonium hydrogenphosphate and ammonium dihydrogenphosphate are also suitable as polymerization catalyst. The components are preferably mixed at room temperature, melted at 80 to 100° C. and the polymerization is then carried out at a higher temperature, in particular 140 to 250° C.

It is also possible for the dicarboxylic acids to be used according to the invention to be employed together with ammonia or other ammonia-donating compounds as a triammonium salt, together with the triammonium salt to be used for example according to the invention. In this case, maleic anhydride, maleic acid, maleic acid derivatives, fumaric acid and fumaric acid derivatives or else mixtures are preferably employed as starting materials. Nitrogen-containing components which can be used are ammonia in liquid form, in gaseous form or as a solution in suitable solvents, as well as ammonia-donating compounds, such as, for example, mono- or diammonium carbonate, ammonium phosphate (for example diammonium phosphate), ammonium sulfate, ammonium acetate or formamide or urea, or even mixtures of various N-containing components.

The following processes and devices are particularly preferred in respect of these preparation variants:

The starting materials can be employed individually or in mixtures, in bulk or in solution. In a preferred embodiment, maleic anhydride is employed as a melt.

If appropriate, the reaction of the starting materials can be carried out in the presence of a solvent. Suitable solvents are water, lower alcohols, polar aprotic solvents, such as dimethylformamide, formamide and ureas, N-alkylpyrrolidone, sulfolane, acetone, dimethyl sulfoxide, polyalkylene glycols, polyalkylene glycol monoalkyl ethers and polyalkylene glycol dialkyl ethers. Supercritical gases, such as, for example, carbon dioxide and ammonia, are also suitable. Water and/or formamide is particularly suitable.

In a preferred embodiment, the starting materials are molten maleic anhydride (starting material A) and triammoniumphosphate (starting material B). Maleic anhydride is preferably employed as starting material A in amounts such that the molar ratio of nitrogen in starting material A relative to the maleic anhydride in starting material A is between 0.9 and 5.0, preferably between 1.0 and 4.0 and especially preferably between 1.5 and 3.0 to 1.

The polymers according to the invention are obtainable by various process routes. Thus, for example, intermediates such as maleic acid diammonium salt, maleic acid monoammonium salt or maleimic acid ammonium salt can be prepared from the abovementioned starting materials in a separate process step and then subjected to thermal polymerization discontinuously or continuously, in bulk or in suitable solvents.

The thermal polymerization is in general carried out at temperatures between 100° C. and 350° C., preferably between 120° C. and 260° C., particularly preferably between 140° C. and 240° C. The residence time is preferably between 1 second and 600 minutes, preferably 5 seconds to 180 minutes, particularly preferably 10 seconds to 150 minutes.

Another process for the preparation of the polymers according to the invention comprises the following steps:

a) At least one of the starting materials described in more detail above under A is continuously brought into contact with at least one of the starting materials described above under B, if appropriate in the presence of a fluidizing agent and also if appropriate with the addition of a comonomer, and if appropriate melted by heating to about 100 to 120° C.

b) The reaction mixture obtained in situ is polymerized continuously in a suitable reactor at temperatures from 100 to 350° C., preferably 120° C. to 260° C. and particularly preferably from 140° C. to 240° C., with residence times of 1 second to 600 minutes, particularly preferably 5 seconds to 180 minutes and particularly preferably 10 seconds to 150 minutes.

c) If appropriate, further maleic anhydride or further maleic acid and a base can be metered in at the end of the polymerization. Suitable bases are alkali metal and alkaline earth metal hydroxides or carbonates, such as, for example, sodium hydroxide solution, potassium hydroxide solution, sodium carbonate or potassium carbonate, ammonia and amines, such as triethylamine, triethanolamine, diethylamine, diethanolamine, alkylamines and the like.

A preferred embodiment of the general process described above comprises carrying out the reaction of the starting materials (A, B) essentially adiabatically in the first reaction step and employing the heat of reaction thereby liberated to bring the reaction mixture to the polymerization temperature, and to at least partly polymerize the N-containing low molecular weight derivative in the second reaction step to give a polymer with repeating succinyl units.

Suitable devices for sufficiently rapid mixing of two streams of liquid are known from many literature sources and patents (for example Ullmmann: Encyclopedia of Industrial Chemistry, 1982, Volume B2, Chapter 25; Volume B4, 561–586; Perry's Chemical Engineers' Handbook, 6th Edition (1984), McGraw-Hill, N.Y., 21–61; M. H. Pohl, E. Muschelknautz, Chem. Ing. Tech. 51 (1979), 347–364; Chem. Ing. Tech. 52 (1980), 295–291).

Preferred devices for rapid mixing of the streams of starting material are all types of jet mixers, static mixers and dynamic mixers. Particularly preferred devices for rapid mixing of the starting materials and for starting the exothermic reaction are jet mixers, further advantages of which lie in hermetic tightness, variably adjustable mixing energy and global plug flow characteristics.

In a preferred embodiment, the starting materials are mixed in a rapid-mixing apparatus of the abovementioned construction when carrying out the first reaction step, in order to avoid undesirable secondary reactions, if appropriate with heating, and the exothermic formation of the intermediates is carried out in parallel or thereafter. The heat thereby liberated is essentially stored in the starting material/intermediate mixture. The reaction mixture is thereby brought to the polymerization temperature, and where appropriate all or at least some of the organic solvent or the water and the water formed during the reaction are evaporated off. In a particularly preferred embodiment, mixing is carried out within less than 2 seconds and the exothermic formation of the intermediates within less than 60 seconds. The reaction mixture emerging from the first reaction stage is then introduced into a suitable apparatus for polymerization.

All apparatuses which, with a narrow residence time distribution of the viscous-liquid phase, allow the necessary minimum residence time for polymerization and at the same time at least partial evaporation of the solvent, in particular the water, and of the water formed during the reaction are suitable in principle for the thermal polymerization.

Preferred devices for the thermal polymerization are thus all apparatuses which have a defined residence time with a narrow residence time distribution for the solid or highly viscous liquid phase and at the same time allow good temperature control by at least partial evaporation of the solvent (organic solvent and/or water) and/or of the water of reaction formed in the polymerization. Such preferred devices can be, for example, a) Delay tubes b) High-viscosity reactors (for example screw, List reactor, Buss reactor)

c) Dryers (for example paddle dryer, spray dryer, plate dryer, belt dryer)

d) Stirred tank cascade e) Thin film evaporator f) Multi-phase helical tube reactors (DT 1 667 051, DE-A 219 967)

Particularly good results are achieved if the starting materials (A, B) are fed to a jet mixer downstream of which is a tube reactor or a multi-phase helical tube. This apparatus combination has proved to be particularly suitable for carrying out the process according to the invention.

To control the reactor temperature of the reactions carried out, the reaction mixture can be completely or else partially circulated, in combination with removal of heat. All reactors of the abovementioned construction with recycling of the reaction mixture in combination with removal of heat and all loop-type reactors are particularly suitable for such a reaction procedure.

In another variant of the process of the invention, to avoid too rapid and sharp an increase in temperature of the reaction mixture because of the very exothermic rapid formation of intermediates, one starting material component can be metered in at several points along the tube or multi-phase helical tube reactor in a suitable manner, so that an optimum temperature profile can be achieved. This avoids the occurrence of temperatures which are too high, which may lead to product damage. The number of additional metering points (without the metering into the mixing nozzle at the tube or multi-phase helical tube reactor intake) is preferably in the region of up to 10. The method of feed is chosen such that good mixing with the reaction solution takes place.

The metering points also serve to feed in the comonomers (C) which are optionally to be added. C is understood as meaning, for example, amino acids, such as glycine etc.

At the same time, the last metering point, which is shortly before the reactor outlet, can be used to add one of the abovementioned bases and if appropriate further starting material A in order to achieve grafting of the polymer for example with imidodisucciate units.

The starting materials can be mixed at temperatures between 0° C. and 200° C., depending on the starting materials used. The exothermic adiabatic reaction of the first reaction step then provides sufficient heat, so that the second reaction step can then take place at 100 to 350° C., preferably at 120 to 260° C. and particularly preferably at 140 to 240° C., depending on the nature and concentration of the starting materials used. The temperature is advantageously adjusted via the pressure in the reactor and the flow rates of the starting materials (A, B) added, if appropriate by the content of organic solvent and/or water. Cooling and heating media can also be employed to assist the temperature control during the reaction. Product-starting material regions with different temperatures furthermore can be brought into contact directly or indirectly in the reaction system for the purpose of heat exchange.

The residence times of the abovementioned starting materials in the reactor system which can be employed are up to 600 minutes. Residence times of up to 180 minutes are preferred. Residence times which decrease with increasing temperature are particularly preferred. The residence time in the reactor system is preferably chosen such that practically complete conversion of starting material A, which is employed in less than the molar amount, preferably maleic anhydride, is ensured. For practically complete polymerization, it may be necessary for the monomer and oligomer mixture already obtained shortly after mixing in the first reaction zone, for example in a tube reactor, to be reacted in another device proposed above, preferably a high-viscosity reactor. However, a high-viscosity reactor in which both steps are carried out until polymer formation is complete can particularly preferably be employed. The resulting reaction products are hot solutions or solvent-containing or water-containing melts, depending on the water and solvent content, because of the reaction enthalpy liberated. The reaction enthalpy can be largely utilized in the reactor. Optimum heat control is thereby achieved with low investment and operating costs of a chemical engineering plant, leading to a high profitability.

If the oligomer-containing melts are used in a high-viscosity reactor, in a preferred reaction procedure the rate of reaction can be considerably increased, in contrast to the direct synthesis from the intermediate maleic acid diammonium salt or maleimic acid ammonium salt which is likewise possible, in such a device owing to the viscous mass which is already preheated and partially depleted of solvents by evaporation because of the heat of reaction liberated. The residence time is lowered considerably, compared with the prior art, by this procedure.

The process can be carried out continuously or discontinuously. Preferred reactors are high-viscosity reactors, for example screw, List and Buss reactors.

The primary polymer products can first be powdered and then washed out with water, in which case the polysuccinimide remains and can be hydrolyzed, for example, in the customary manner to give polyaspartic acid or to give salts, for example sodium polyaspartic acid However, the primary polymerization products can also be converted into a PAA-containing copolymer salt by reaction with a base, if appropriate in the presence of water. This conversion of PSI-containing copolymers into PAA-containing copolymers is effected by hydrolysis in a suitable device. A pH of between 5 and 14 is preferably suitable here. In a particularly preferred form, a pH of 7 to 12 is chosen, in particular by addition of a base. Suitable bases are alkali metal and alkaline earth metal hydroxides or carbonates, such as, for example, sodium hydroxide solution, potassium hydroxide solution, sodium carbonate or potassium carbonate, ammonia and amines, such as triethylamine, triethanolamine, diethylamine, diethanolamine, alkylamines and the like. The hydrolysis of the PSI can thus take place partially or fully.

Low molecular weight fractions (in particular phosphoric acid salts) can be separated off from this solution by customary membrane technology of the kind used for seawater desalination. However, they can also remain in the product.

The temperature during the hydrolysis is suitably in a range including up to the boiling point of the suspension or solution containing succinyl groups, preferably 20 to 150° C.

If appropriate, the hydrolysis is carried out under pressure. If appropriate, the hydrolysis is carried out with the addition of another monoethylenically unsaturated carboxylic acid derivative. Examples of suitable derivatives are maleic anhydride, maleic acid, citraconic acid, itaconic acid, aconitic acid, acrylic acid and fumaric acid Addition of the amino groups of the N-terminal end of the polymer molecule onto the monoethylenically unsaturated carboxylic acid derivative present in salt form can take place under the basic conditions of the hydrolysis.

Depending on the polymerization conditions described above, the primary polymerization products can also have ethylenically unsaturated end groups. It may therefore be expedient optionally to add aminocarboxylic acids as well, for example glycine, aspartic acid, lysine, glutamic acid and the like, to the reaction mixture during the basic hydrolysis. Grafting of the polymer end groups is achieved by this measure.

The polymeric free acids can also be liberated from the salts, however, by continuous or discontinuous ion exchanger treatment.

The polymers prepared according to the invention are distinguished by an improved calcium bonding capacity. They exhibit, furthermore, complexing properties with respect to heavy metals, such as, for example, copper, iron and the like. They can be used as an additive in low-phosphate and phosphate-free detergents and cleaning agents. The polymers are builders for detergents and have the effect of reducing encrustation and graying on washed textile goods during the washing operation.

The polyaspartic acids prepared according to the invention furthermore inhibit and delay the precipitation of calcium carbonate, calcium sulfate and calcium phosphate from aqueous solutions, and are therefore suitable as water treatment agents. They can be added to the water in cooling circulations, evaporators or seawater desalination plants. They can furthermore be employed as agents which prevent deposits during evaporation of sugar juice.

On the basis of their complexing property with respect to heavy metals, the polymers can also be used as stabilizers for bleaching agents such as hydrogen peroxide in bleaching processes.

EXAMPLES

The primary polymerization products were characterized by means of elemental analysis. In this, in addition to carbon and hydrogen, three different types of nitrogen were also determined. The analysis distinguished between ionically bonded nitrogen (ammonium ions), hydrolytically sensitive nitrogen (for example amide or imide nitrogen) and "non-hydrolyzable" nitrogen (amine nitrogen). The optimum hydrolysis necessary for an improved activity could be monitored in this manner.

The polymers according to the invention obtained after the hydrolysis were analyzed with the aid of $^1$H-NMR and $^{13}$C-NMR both in the salt form and after conversion into the free acid. The imidodisuccinic acid units were identified with the aid of the chemical shifts of $\delta_1$=3.8 ppm ($^1$H-NMR) and $\delta_2$=55.5 ppm ($^{13}$C-NMR) for the CH groups and of $\delta_3$=2.7 ppm ($^1$H-NMR) and $\delta_4$=36.7 ppm ($^{13}$C-NMR) for the CH$_2$ groups.

The residual monomer content was determined by HPLC and the polymer distribution by GPC against polyacrylates or polyaspartic acids from Sigma as a standard.

Example 1

98 g of maleic anhydride and 104 g of triammonium phosphate trihydrate were heated to 180° C. under nitrogen over the course of 45 minutes. This temperature was maintained for 1 hour. Water of crystallization and of the reaction were then removed for 1 hour by application of a vacuum. The mixture was then cooled, comminuted with water in a glass beaker using a mixer, filtered off with suction, washed and dried. 95 g of PSI as a pale product were obtained. The molecular weight was 2,580 and the α/β ratio 23/77.

Example 2

98 g of maleic anhydride and 103.5 g of triammonium phosphate trihydrate were heated to 240° C. (under N$_2$) over the course of 110 minutes. This temperature was maintained for 1 hour. A full water-pump vacuum was then applied for 1 hour, and the mixture was subsequently cooled. The PSI obtained was powdered, washed with water until salt-free and dried in vacuo at 50° C. 99 g of pale product were obtained. The molecular weight was Mw 2550.

Example 3

98 g of maleic anhydride and 203 g of triammonium phosphate trihydrate were heated to 240° C. under N$_2$ over the course of 160 minutes. The temperature was maintained for 1 hour, and a water-pump vacuum was then applied for 1 hour at the same temperature. After cooling, the mixture was powdered, washed with water and dried in vacuo at 50° C. 88 g of PSI were obtained. The molecular weight Mw was 2096.

Example 4

133 g of aspartic acid and 10 g of ammonium dihydrogenphosphate in 100 ml of water were heated to the boil under N$_2$ over the course of 30 minutes. The mixture was then boiled for 1 hour, the water was removed by distillation at atmospheric pressure over the course of 1 hour, and the mixture was heated to 200° C. over the course of 2.5 hours, left at this temperature for 1 hour, then dried under a full water-pump vacuum for 1 hour and subsequently cooled. The mixture was powdered and washed with water, and the product was filtered off with suction and dried under vacuo at 50° C. 104 g of PSI were obtained. The molecular weight Mw was 5858.

Example 5

Example 5 was carried out analogously to Example 4. However, the catalyst employed was 10 g of diammonium hydrogenphosphate. The molecular weight obtained was Mw 4566.

Example 6

Example 6 was carried out analogously to Example 4, but without catalyst. The molecular weight obtained was Mw 2880.

Example 7

Example 7 was carried out analogously to Example 4. The catalyst employed was 10 g of triammonium phosphate trihydrate. The molecular weight obtained was Mw 4800.

Example 8

9 mol of maleic anhydride and 9 mol of triammonium phosphate trihydrate were heated to 140° C. in the flask with stirring and under N$_2$. This melt was slowly introduced into the transfer chamber of a ZSK 32 screw, during which the temperature in the screw was maintained at from 180 to 190° C. (heating). At 20 revolutions per minute, the residence time was 6 minutes. The PSI was discharged as a fast-hardening, pale extrudate, which was granulated. The granules were powdered, washed with water and dried in vacuo at 50° C. The molecular weight was 2400.

This experiment can also be carried out continuously with simultaneous feed of maleic anhydride and triammonium phosphate trihydrate.

I claim:

1. A process for the preparation of a polymer with repeating succinyl units, which comprises bringing together at least one optionally substituted 1,4-butanedicarboxylic acid, butenedicarboxylic acid or a derivative thereof with a triammonium salt of a polybasic acid and carrying out the polymerization for 1 second to 180 minutes while heating.

2. A process for the preparation of a polymer with repeating succinyl units, which comprises bringing together the anhydride of an optionally substituted 1,4-butanedicarboxylic acid or butenedicarboxylic acid with a triammonium salt of an acid and carrying out the polymerization for 1 second to 180 minutes while heating.

3. The process as claimed in claim 1, wherein the triammonium salt of citric acid, phosphoric acid or phosphorous acid is used as the ammonium salt.

4. The process as claimed in claim 1, wherein maleic acid, maleic anhydride or fumaric acid is used.

5. The process as claimed in claim 1, wherein the triammonium salt is triammonium phosphate.

6. The process as claimed in claim 1, wherein maleic anhydride and triammonium phosphate are reacted with one another.

7. The process as claimed in claim 1, wherein 0.3 to 1 mol of triammonium salt is used per mole of dicarboxylic acid or anhydride.

8. The process as claimed in claim 1, wherein maleic anhydride reacts with triammonium phosphate in the melt at 60 to 100° C., the temperature is increased to at least 140° C. to 250° C. for the polymerization and any water formed during the reaction is subsequently or simultaneously removed.

9. A process for the preparation of a polymer with repeating succinyl units, which comprises polymerizing a nitrogen-containing dicarboxylic acid, in particular aspartic acid, in the presence of catalytic amounts of an ammonium salt, wherein said polymerization step is carried out for 1 second to 180 minutes.

10. The process as claimed in claim 9, wherein the ammonium salt is used in an amount of 0.01 to 0.2 mole per mole of nitrogen-containing dicarboxylic acid.

11. The process as claimed in claim 9, wherein the ammonium salt is an ammonium phosphate.

12. The process as claimed in claim 9, wherein the nitrogen-containing dicarboxylic acid and triammonium phosphate are heated together and melted at 80 to 100° C. and polymerization of the resulting product is carried out at not less than 140 to 250° C.

13. The process as claimed in claim 1, wherein the resulting polymerization product is hydrolyzed with a base in an aqueous medium.

14. The process as claimed in claim 13, wherein the crude polymer product is powdered and then low molecular weight fractions, in particular phosphate, are washed out with water and the product is then hydrolyzed to give an alkali metal salt or amine salt or the free acid.

15. The process as claimed in claim 13, wherein the crude hydrolysate is freed from low molecular weight fractions by means of diffusion through membranes.

16. A method of using a polymer obtained as claimed in claim 1, comprising the step of adding the polymer to a formulation as a complexing agent for complexing metals, or as a precipitation inhibitor for inhibiting the precipitation of salts or crystals in an aqueous medium or as a dispersing agent for dispersing organic or inorganic particles in an aqueous medium.

17. The process as claimed in claim 1, wherein maleic anhydride is first reacted with triammonium phosphate in the melt at 60 to 100° C. in the presence of water of crystallization, the temperature is then increased to 140° C. to 250° C. for the polymerization and any water formed during the reaction is subsequently or simultaneously removed.

18. The process as claimed in claim 1, wherein maleic anhydride is first reacted with triammonium phosphate in the melt at 60 to 100° C., the temperature is then increased to 160° C. to 250° C. for the polymerization and any water formed during the reaction is subsequently or simultaneously removed.

19. The process as claimed in claim 1, wherein maleic anhydride is first reacted with triammonium phosphate in the melt at 60 to 100° C., the temperature is then increased to 180° C. to 200° C. for the polymerization and any water formed during the reaction is subsequently or simultaneously removed.

20. A process for the preparation of a polymer with repeating succinyl units, which comprises bringing together at least one optionally substituted 1,4-butanedicarboxylic acid, butenedicarboxylic acid or a derivative thereof with a triammonium salt of a polybasic acid and carrying out the polymerization for 10 seconds to 150 minutes while heating.

* * * * *